United States Patent

Stucky et al.

[15] 3,668,397
[45] June 6, 1972

[54] MEASURING SYSTEM SUPPORT

[72] Inventors: Duane L. Stucky; Richard G. Donaldson; Allen D. Alexander, all of Columbus, Ohio

[73] Assignee: Industrial Nucleonics Corporation

[22] Filed: Feb. 16, 1971

[21] Appl. No.: 115,200

[52] U.S. Cl..................250/83.3 D, 33/125 R, 248/188.4
[51] Int. Cl..........................................G01t 1/16
[58] Field of Search..............33/125 R; 73/105; 248/188.4; 250/83.30

[56] References Cited

UNITED STATES PATENTS 3,206,151  9/1965  Lillestrand..........................248/188.4
3,575,600  4/1971  Trachevski........................250/83.3 D

FOREIGN PATENTS OR APPLICATIONS 920,792  8/1962  England............................250/83.3 D

*Primary Examiner*—Donald D. Forrer
*Assistant Examiner*—R. C. Woodbridge
*Attorney*—William T. Fryer, III and C. Henry Peterson

[57] ABSTRACT

The present invention in one form provides an arrangement for support standardization a measuring system. The measuring system comprises a measuring device that is supported by one or more tubes held under tension in a frame. The tubes are clamped to the frame while the device is measuring and unclamped to allow the tube to resume a free position. The clamps support the tubes in the free position, when the clamps are reclamped. Changes in the frame dimensions, due to thermal effects are compensated for, retaining the position of the measuring device relative to the material being measured substantially constant, for more accurate and reproducible measurements.

5 Claims, 6 Drawing Figures

INVENTORS
DUANE L. STUCKY
RICHARD G. DONALDSON
ALLEN D. ALEXANDER
BY William T. Fryer III
ATTORNEY INVENTORS
DUANE L. STUCKY
RICHARD G. DONALDSON
ALLEN D. ALEXANDER
BY William T. Fryer III
ATTORNEY

MEASURING SYSTEM SUPPORT

The present invention relates to measuring systems designed to measure a property of a material, such as thickness, weight per unit area, moisture, or other characteristics. In some of these measuring systems a measuring device has a member attached at its ends to the arms of a frame and the measuring device is supported by the member adjacent the material. The measurement may be dependent on whether the measuring position is maintained, so the support is built to adequately handle the measuring device weight, to minimize the support deflection.

An example of such measuring systems is found in U.S. Pat. No. 3,125,680 assigned to the assignee of the present application. The tubes used to support the measuring device were supported along their length by adjustable screw-nut brackets that permitted minor change in position of the measuring head in the vertical dimension.

It is also desirable in certain designs to have the member mounting the measuring device under tension, to keep it straight and thereby maintain a uniform distance between the measuring device and the material substantially constant along the member's length. This arrangement is useful especially when the measuring device moves along the member, to scan the material. A measuring system arranged in this manner is shown in British Pat. No. 902,792.

While these prior measuring system supports were quite adequate for most purposes, it becomes apparent that certain designs and installation situations could benefit from further improvement. The weight of the measuring device increased, placing further load on its support member. The likelihood of deflection of the support member increased, and the measuring device position would be changed accordingly.

The installation location of the measuring system also affected the measuring device position. The frame dimensions could change with temperature from a "hot" location, such as a rolling mill, or near the drier of a paper machine.

These considerations resulted in the present invention being developed, to minimize the undesired movement of the measuring device with respect to the material being measured.

One of the objectives of the present invention is to achieve better accuracy and reproducibility of measurements for measuring systems that must perform faithfully over extended periods of operation.

The approach taken in one form of the invention is to support the member under tension by a clamp means that allows desired movement, at appropriate times. The member is stretched to assume a free position, before clamping and then the member is supported in that position. The position of the measuring device is thereby determined for calibration and standardization purposes. During use, the measuring system is support standardized (readjusted substantially to the original measuring device position) by releasing the clamp means, to allow the tensed member to resume its free position. For example, after installation the frame could have been heated and some deflection occurred that changed the measuring device position. The member is reclamped at its free position and the initial position of the measuring device is re-established.

In another form, the invention has provision for releasing the clamp means while the measuring device is adjacent one end of the member, to minimize the load, and the reclamping is performed adjacent one end of the member.

In a further form of the present invention the support standardization is accomplished automatically, releasing the clamping means when the measuring device moves to one end of the member and re-establishing clamping at the free position. The support standardization can be performed periodically, for optimum performance, where the installation requires such regular adjustment.

Figure 1:
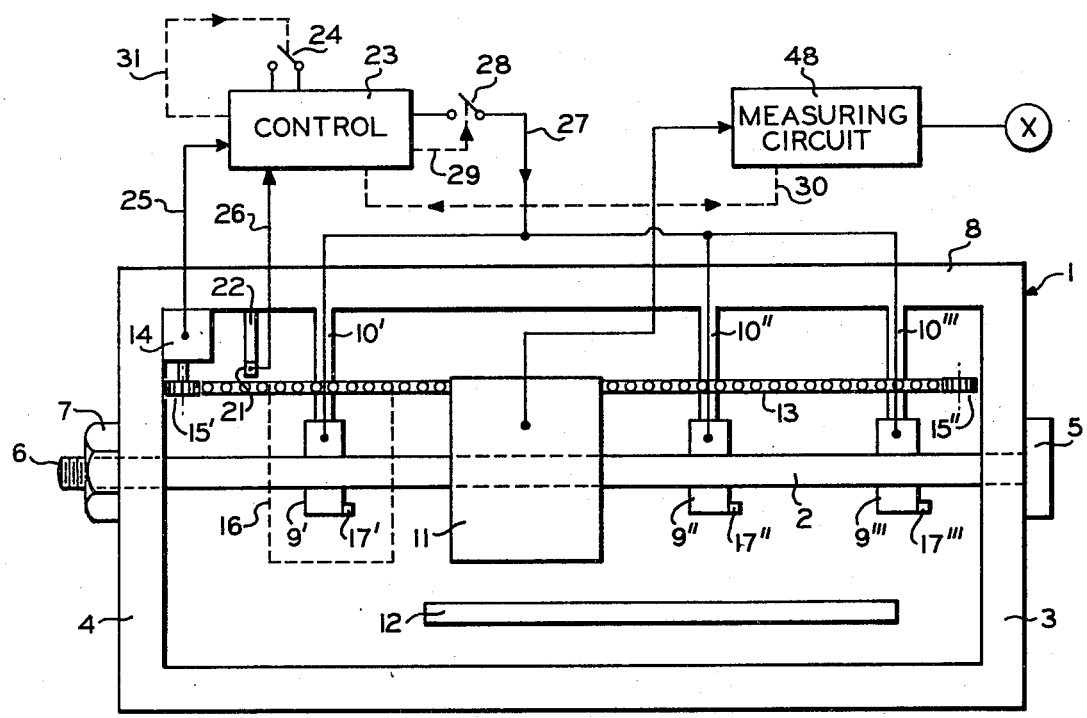
FIG. 1 is a partial schematic presentation of one form of the present invention.

The present invention is described with reference to a radiation type measuring system, using one of various types of measuring devices or sensors, such as nuclear or infrared radiation. It is recognized that other forms of systems and sensors can be used, where there is a need for a support that maintains a desired position of the measuring device relative to the material being measured. The measuring system illustrated in FIG. 1 includes frame 1, a rectangular unit of suitable beams welded or otherwise fixed together to form a rigid structure. An elongated member 2 extends between arms 3 and 4 of frame 1, passing through holes in and freely moveable within arms 3 and 4. Tube 2 has end piece 5 forming a head that abuts arm 3 to prevent further movement toward arm 4. At the opposite end of tube 2 is a screw threaded end 6, extending out from arm 4. Tube 2 is placed under tension to straighten it out by tightening nut 7, compressing frame 1 to some degree, as will be described in more detail further on. Tube 2 is supported by frame 1 from the upper arm 8, by clamps 9', 9'' and 9''' (referred to hereinafter collectively as clamps 9) rigidly fastened to frame arm 8 by downwardly extending brackets 10', 10'', and 10''', respectively. Clamps 9 carry the weight of tube 2, and constrain its movement downward and to the sides and in other directions, depending on the particular clamp design used. Mounted on tube 2 is the measuring device 11, slidable thereon to move over a sheet material 12 having a property to be measured. A drive mechanism shown here in part with the continuous chain 13, motor 14 and gears 15' and 15'' at each end of tube 2 moves the measuring device 11 for scanning material 12 or to an off-sheet position 16 (shown in dotted lines).

Initially when the measuring system is set up in the industrial plant where it is to operate, clamps 9 are released by actuating control arms 17 (17', 17'', and 17''') and tube 2 is free to move and assumes a position determined primarily by the tension thereof within frame 1. This reference position corresponds to the free position of tube 2 carrying the weight of the measuring device 11 as shown by the tube axis 19 in FIG. 2. In order to minimize the effect of the weight of the measuring device 11 along the length of tube 2, measuring device 11 is moved, manually or by motor 14 to off-sheet position 16 before clamps 9 are released. The off-sheet position minimizes the deflection in tube 2 due to measuring device 11.

After tube 2 has assumed its free position, clamps 9 are reclamped and support tube 2 in that free position. The measuring device 11 is calibrated in the usual manner, based on this position of measuring device relative to material 12.

Figure 2:
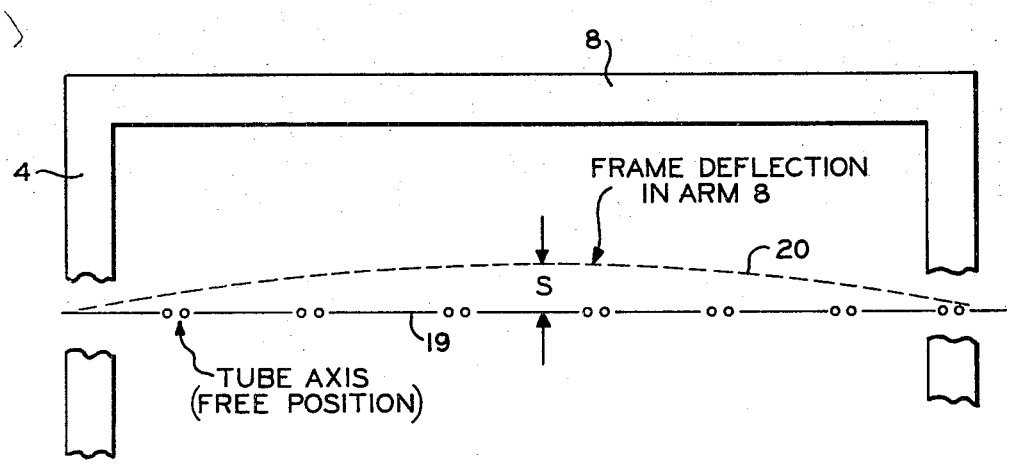
FIG. 2 is a diagram illustrating the effect of frame deflection.

The installation location may be subject to temperature changes and the effect of these conditions will be explained with reference to FIG. 2. Frame 1 is under some compression, due to the tension on tube 2. Any initial deflection, S between the tube axis 19 and 20 of frame arm 8, has been compensated initially when the system was first set up, as explained above. The change in temperature can cause more or less deflection, S, due to the thermal coefficient of the materials used and the axis 19 of tube 2 will change, along with the position of clamps 9. The result is that a small and possibly significant change in measuring device position can occur relative to material 12.

To overcome this problem and to provide some degree of support standardization, the present invention provides for restoring tube 2 to its free position thereby maintaining closer tolerance on the position of measuring device 11. Measuring device 11 is moved to the off-sheet position 16. While at the off-sheet position, clamps 9 are released and tube 2 resumes its free position. Clamps 9 are reclamped to support tube 2 in its free position. The system is now support standardized.

Various modification can be made to arrangement disclosed, to carry out the support standardization. For example, as shown in FIG. 1, a switch 24 can be closed to automatically bring measuring device 11 off sheet. Motor 14 is coupled to control unit 23 over line 25. A position sensor 21, such as a microswitch mounted on bracket arm 22 attached to frame arm 8, senses the movement of measuring device 11 to off-sheet position 16. Sensor 21 is coupled over line 26 to a control unit 23 to initiate a stop signal, and motor 14 stops when the off-sheet position 16 is reached. The remaining part of support standardization can be performed manually, or if desired, these steps can be performed automatically. Control unit 23 is connected over line 27, through switch 28 to each of clamps 9. Each of clamps 9 includes a suitable actuator, electrical or pneumatic, for example, to release clamps 9 by control unit 23 closing switch 28 (control action initiated by dotted line 29) when the measuring device is in off-sheet position 16.

A suitable time is allowed for tube 2 to assume its free position and then control unit 23 opens switch 28, reclamping clamps 9. The measuring device then is returned to its normal measuring function.

It is convenient also to coordinate the support standardization into the usual electronic standardization as described more fully in U.S. Pat. No. 2,829,268, assigned to the assignee of the present application. Control unit 23 can activate the electronic standardizations known as source and zero standardization, if required (control activation indicated by dotted line 30) after support standardization. The entire sequence can be made automatic, including the automatic, periodic activation of switch 24 by control unit 23 (control activation indicated by dotted line 31) to start the sequence of off-sheet movement, stopping the measuring device in the off-set position 16, releasing clamps 9, tube 2 assuming its free position, reclamping clamps 9 at the off-sheet position 16, electronic standardization, if required, and returning measuring device 11 to its measuring position and function.

Figure 3:
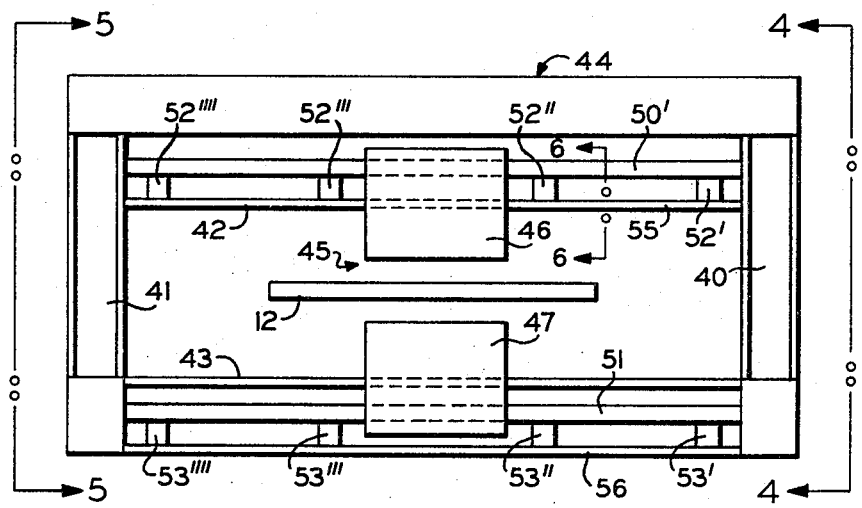
FIG. 3 illustrates one form of the invention applied to a large O-bracket.

The design of the frame 1 and the arrangement of clamps 9 can take many forms with the present invention. FIG. 3 illustrates another type of frame 44 more commonly used, and generally referred to as a wide-O bracket. It comprises vertical I-beams 40 and 41 welded to upper and lower horizontal I-beam 42 and 43, respectively, to form a rigid rectangular unit. Material 12 passes through the center of frame 44, in a plane perpendicular to the plane of the drawing. The measuring unit 45 comprises an upper head 46 containing the detector and a lower head 47 containing the source of radiation to which the detector is responsive. This type of measuring device is referred to as a transmission gauge.

The control unit 23 related control lines, drive means including motor 14, and the measuring unit 48 of FIG. 1 are not repeated in FIG. 3, to simplify the presentation. It is understood that they are applied in the same manner for the described purpose.

Figure 5:
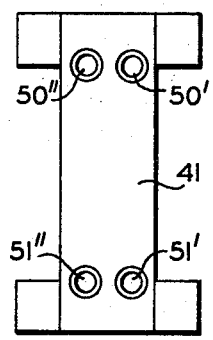
FIG. 5 is a view of the opposite end from FIG. 4 of the bracket of FIG. 3, along the lines 5—5.
Figure 4:
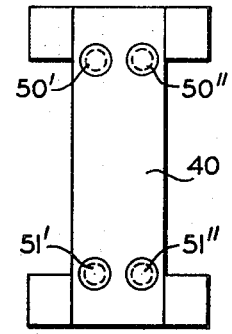
FIG. 4 is an end view of the bracket of FIG. 3, along lines 4—4.
Figure 6:
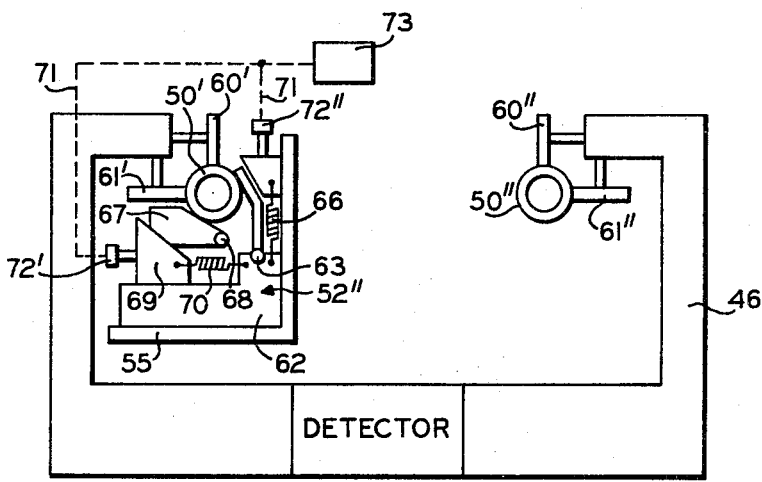
FIG. 6 is an illustration of one form of support, partially in schematic form, for a measuring device and the tubes in the bracket of FIG. 3, the view taken along the lines 6—6 of FIG. 3.

Frame 44 has an upper set of tubes 50 and lower set of tubes 51 for supporting measuring device 45. Clamps 52 and 53 rest on the lower flanges 55 and 56, respectively of I-beams 42 and 43, respectively. FIG. 6 illustrates the design of all the clamps 52 and 53 supporting tube sets 50' and 51' respectively. While not shown, the same type of clamps are used for tubes 50'' and 51''. The vertical I-beams 40 and 41 receive tube sets 50 and 51 and placed them under tension, with tube heads adjacent I-beam 40 and nuts on screw thread ends at I-beam 41, as previously described (FIGS. 4 and 5).

The support of measuring device 45 on tube sets 50 and 51 is by means of a pair of wheels 60 and 61 that ride on each tube. Clamp 52'' is shown in partially schematic form to make the presentation simpler. The other clamps 52 and 53 have the same design. Clamp 52'' is shown in the clamped position. A clamp base 62 is fastened to the face of I-beams flange 55. Attached to base 62 is an inner arm 64 pivotally mounted at one end 63 and having its other end shaped to engage tube 50' on the upper side. Arm 64 is held against tube 50' by a wedge shaped release member 65 that acts against base 62 and the face of arm 64 opposite tube 50'. Release member 65 is held against arm 64 by a spring 66, pulling release member 65 toward I-beam flange 55. Working in concert with arm 64 is another arm 67 having a face that abuts tube 50' on its lower side and pivotally mounted at the other end 68 to base 62. Another release member 69, wedge shaped holds arm 67 against tube 50', through the action of spring 70 pulling release member 69 towards pivoted arm end 68. Each of the release members has a manually operable arm 72 for releasing the clamping action and these arms are operated manually together (represented by dotted lines 71), or they can be actuated together by a suitable mechanism, such as an electromagnet 73.

The operation of clamp 52'' will be described, recognizing that the other clamps perform the same functions. In the position shown, tube 50' is supported by clamp 52''. After tube 50' assumed its initial position, with all clamps released, all clamps were reclamped and the arms 64 and 67 moved in, under the action of the release members 65 and 69, respectively to retain tube 50' in the position it assumed. During each support standardization, tube 50' is allowed to resume its free position and clamp 52'', when released allows tube 50' to move, and can support tube 50' in a number of vertical and/or horizontal positions assumed by tube 50'.

While one embodiment of clamp has been disclosed, it is apparent that other forms can be used, such as a clamp that completely surrounds the tube, or an adjustable base supporting the tubes that can be released, has adjustable height and lateral movement to reclamp the tubes in the free position.

Further, while the presence of the measuring device on the tubes does produce some small deflection, even when located at the end of the tube, it is considered negligible. Alternatively, the weight of the measuring source can be removed from the tube during support standardization, to eliminate even this small deflection, using a suitable lever assembly.

These and other arrangements are all forms of the present invention as defined in the appended claims.

We claim:

1. A support for positioning a measuring system adjacent a material to be measured and maintaining alignment relative to the material, comprising a measuring device, an elongated, rigid member, means for supporting said measuring device on said member, a rigid frame having opposite arms for holding said member at both member ends, placing said member under tension along the length of said member within said frame, said frame having clamp means between the ends of said member for supporting said member, said clamp means being operable to release said member to assume a free position determined primarily by said tension, and to re-establish support of said member in said free position.

2. The apparatus, as described in claim 1, wherein said clamp means comprises several clamping devices disposed along said member length for supporting said member, each of said clamping devices having means for supporting said member in the position assumed by said member, each of said clamping devices having means for releasing said member, to permit said member to assume a free position determined primarily by said member tension, and each of said clamping devices being operable to support said member in the said free position.

3. Apparatus, as described in claim 2, wherein said clamp means includes means for simultaneously releasing each of said clamp means, and after said member has assumed said free position, simultaneously reclamping said clamping means to support said member in said free position.

4. Apparatus, as described in claim 1, wherein said measuring device is slidable along said member to one or more measuring positions adjacent a material to be measured, and to a position adjacent to one end of said member for adjustment, said clamp means being released when said measuring device is in said end position, and after release, said clamp means reclamping said member in said free position while said measuring device is adjacent one end of said member.

5. Apparatus as described in claim 3, wherein said support means permits slidable movement of said measuring device along said member, and said clamp means includes a control means that positions said measuring device along said member length, and means for automatically releasing said clamp means when said measuring device is positioned adjacent one end of said member and thereafter reclamping said clamp means to support said tube while said measuring device is adjacent one end of said member.

* * * * *